United States Patent [19]

Ehrlich

[11] Patent Number: 4,497,123
[45] Date of Patent: Feb. 5, 1985

[54] SHOE-SOLE AND METHOD FOR MAKING THE SAME

[75] Inventor: Johann Ehrlich, Krems, Austria

[73] Assignee: Patoflex Corporation, Cave Creek, Ariz.

[21] Appl. No.: 354,592

[22] Filed: Mar. 4, 1982

[30] Foreign Application Priority Data

Mar. 5, 1981 [AT] Austria ............................. A1028/81

[51] Int. Cl.³ ...................... A43B 13/04; A43B 13/28
[52] U.S. Cl. ...................................... 36/32 R; 36/12; 36/11.5; 36/101; 12/142 S
[58] Field of Search ................. 36/31, 30 R, 32 R, 15, 36/101, 11.5, 12, 13, 87; 12/142 S, 142 RS; 264/244; 425/129 S

[56] References Cited

U.S. PATENT DOCUMENTS

| | | | |
|---|---|---|---|
| 2,607,133 | 8/1952 | Marlowe | 36/11.5 |
| 3,375,537 | 4/1968 | Cali | 36/12 X |
| 3,452,378 | 7/1969 | Ferreira | 264/244 X |
| 4,172,330 | 10/1979 | Kao | 36/101 X |
| 4,177,582 | 12/1979 | Ehrlich, Jr. | |
| 4,347,637 | 9/1982 | Ardito | 12/142 S |

FOREIGN PATENT DOCUMENTS

| | | | |
|---|---|---|---|
| 1925046 | 11/1970 | Fed. Rep. of Germany | 36/101 |
| 2637092 | 1/1978 | Fed. Rep. of Germany | |
| 873511 | 3/1942 | France | 36/31 |
| 724092 | 11/1966 | Italy | 36/12 |
| 7807177 | 1/1980 | Netherlands | 36/101 |
| 254221 | 7/1926 | United Kingdom | 36/15 |

*Primary Examiner*—James Kee Chi
*Attorney, Agent, or Firm*—Salter & Michaelson

[57] ABSTRACT

A shoe sole and a method of manufacture thereof, the shoe sole consisting of a plastic material having a fastening means embedded therein for fastening the sole to the shoe uppers, the fastening means being formed by sprayed die castings of unfoamed plastic material.

32 Claims, 3 Drawing Figures

U.S. Patent    Feb. 5, 1985    4,497,123
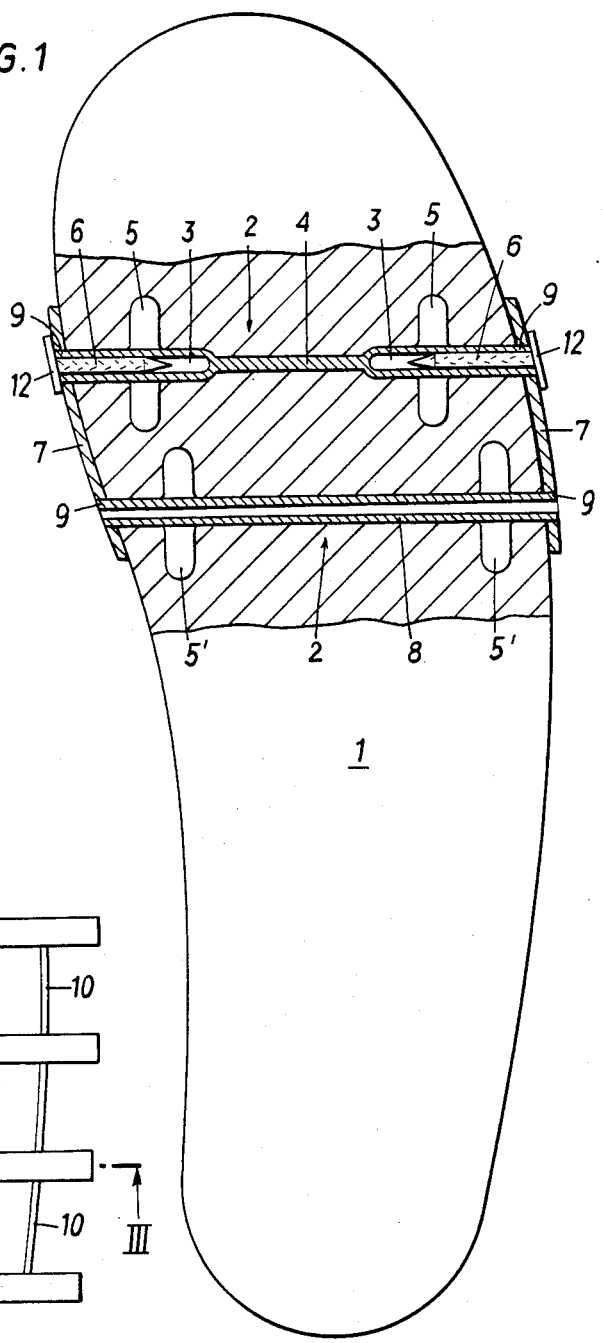
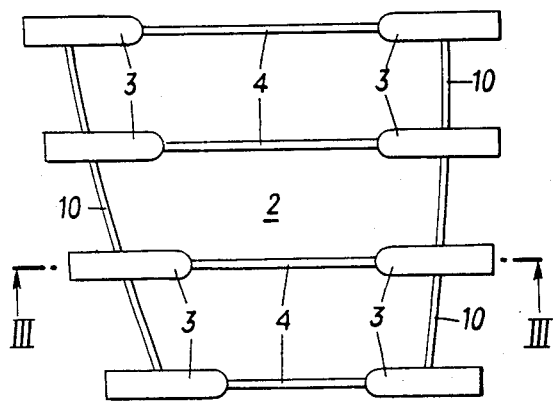
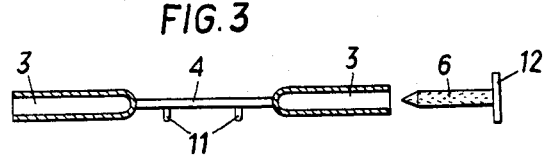

SHOE-SOLE AND METHOD FOR MAKING THE SAME

BACKGROUND AND SUMMARY OF THE INVENTION

The invention relates to a shoe-sole consisting at least partially of plastic.

The invention is further concerned with a method for making such a shoe-sole. As a plastic material for instance foamed polyurethane, soft-PVC, ethylene-vinyl-acetate or thermoplastic caoutchouc may be used.

It is already known to make shoe-soles from plastic, as from foamed polyurethane, because such shoe-soles prop the foot softly and elastically and cause an agreeable feeling during walking. The fixing of the uppers to such shoe-soles of hard foamed polyurethane has been accomplished heretofore by nailing, screwing or clipping whereby the uppers in general are fastened laterally on the shoe-sole. With this fixing method the fixing elements frequently pluck out so that then the uppers separate themselves from the sole.

For soles of soft foam of polyurethane it is already known to fasten the uppers to the sole with an adhesive. This procedure is very laborious and expensive whereby nevertheless a satisfactory connection between sole and uppers is not ensured.

It is an object of the present invention to provide a shoe-sole consisting at least partially of plastic with which a simple and secure fixing of the uppers is possible.

It is a further object of the invention to provide a shoe-sole consisting at least partially of plastic by which damaging of the shoe-sole during walking, particularly by the tension forces thereby exerted by the uppers to the shoe-sole, is avoided.

It is another object of the invention to provide a shoe-sole with which a connection between the shoe-sole and the uppers can be made in such a way that the connection has a certain elasticity taking bendings and twistings of the shoe-sole, as occurring during walking. This elasticity shall thereby suitably be adapted to the properties of the material of the sole.

A further object of the present invention is to form the shoe-sole in such a manner that the uppers may be fixed quickly and with less expenditure of work. Moreover, a good anchoring of the joint members within the shoe-sole shall be ensured.

BRIEF DESCRIPTION OF THE DRAWINGS

In the following the invention will be described with reference to the drawings showing various embodiments of the invention.

FIG. 1 shows a cross-sectional view of a sole formed in accordance with the invention in a plane parallel to the walking surface of the sole wherein two differently formed sprayed die castings are provided; FIG. 2 illustrates the sprayed die castings in their preferred embodiment, wherein a grating is formed; and FIG. 3 shows a cross-section along the line III—III of FIG. 2 together with a pin.

DETAILED DESCRIPTION OF THE DRAWINGS

A sole 1, illustrated in FIG. 1, is thought for a sandal, wherein the uppers consist only of a loop. Therefore, merely two sprayed die castings 2 of plastic are represented within the range of the ball of this sole 1. Normally however, even then, if only a loop forms the uppers, more than two of such sprayed die castings will be provided, for instance three or four sprayed die castings.

Furthermore, in FIG. 1 an embodiment is shown wherein only two opposite fastening points for the uppers form a common sprayed die casting. The upper sprayed die casting 2 of FIG. 1 consists of two sockets 3 interconnected by a longitudinal strap 4 of smaller cross-section than the sockets. Moreover, this sprayed die casting is provided with wing-like protrusions 5 by which the position of the sprayed die casting within the sole is fixed. Pins 6 may be inserted into the sockets 3 in a manner described later in detail for holding uppers 7.

The lower sprayed die casting 2 of FIG. 1 consists of a tube 8 extending over the whole width of the sole and having wing-like protrusions 5'. For fixing the uppers 7 either equally pins 6 may be inserted on both sides or a seem material can be pulled through used for fixing the uppers. Then, the attachment of the uppers 7 on the sole 1 presents a decorative aspect.

As may be seen from the drawings, the free ends of the sockets 3 as well as of the tube 8 project over the lateral surface of the sole to such an extent that these ends can penetrate into openings of corresponding width of the uppers 7. In this way, an additional fixing of the uppers 7 is achieved, thereby facilitating the assembly of the same, since a prefixing of the uppers 7 is caused by pulling the latter over the projecting free ends 9 of the sprayed die castings 2.

A preferred embodiment is illustrated by FIGS. 2 and 3 where only one sprayed die casting is shown as inserted into a mold for making the sole. As apparent, here the sockets 3 opposite to each other are not only interconnected by longitudinal straps 4 but also by transverse straps 10, thus forming a grating adapted to be inserted into the old as a whole. The number of sockets 3 corresponds to the number of the necessary fastening points of the uppers 7 to the sole 1. The grating is inserted into the mold in such a manner that the free ends 9 of the sockets 3 projecting then from the lateral surface of the sole fit into corresponding recesses of the mold, said recesses being located within the range of the separating line of the bipartite mold. In this way the grating is positively secured within the mold without any additional measures necessary. The required spacing of the grating to the bottom of the mold is ensured by studs 11 (vide FIG. 3) protruding from the bottom side of the grating and resting on the bottom of the mold.

It is obvious that also in a grating-like embodiment according to FIG. 2 instead of sockets 3 tubes 8 may be provided replacing likewise the longitudinal straps 4. Further it is obvious, that the longitudinal straps 3 too can be interconnected by the transversed straps 10.

Such a grating-like embodiment has numerous advantages. Thus, the inserting of the sprayed die castings 2 into the mold can be effected for all fastening points of the uppers to the sole 1 by a single manipulation, since all sprayed die castings are interconnected by the grating. In this way an important saving ot time and work is achieved, and the output of the sole produced by one mold is increased. Furthermore, a mutual anchoring of the individual fastening points is obtained by the grating so that partial peak loads can be absorbed by the grating without damaging the sole 1, Particularly with a thin sole, a tearing out of the sprayed die castings 2 is prevented by the grating structure. The grating-like embodiment enables the use of cheaper foams of lower specific density, thereby not only reducing the costs but also diminishing the weight of the sole and thus that of the shoe in a desirable manner, still ensuring a secure anchoring of the uppers on the sole 1.

The pins 6 have a head 12 of a suitable formed decorative aspect.

Preferably the diameter of the pins 6 corresponds to the inner diameter of the sockets 3 or of the tubes 8, or it exceeds the same only insignificantly. In this way it is ensured that with insertion of the pins 6 the latters are in fact well anchored within the sockets 3 or the tubes 8, but there is no important supersession of the material within the sprayed die castings 2 by which the same and consequently also the sole 1 could be damaged. For instance, the pins 6 may be provided with screw threads screwed into an internal thread of the sockets 3 or of the tubes 8. It is, however, also possible to provide the pins 6 with barbs cooperating with projections within the interior of the sockets 3 or the tubes 8. Whereas in the first case a turning movement is necessary for inserting the pins 6, it is sufficient in the second case to push the pins 6 into the holes of the sockets 3 or the tubes 8.

The pins 6 may be of metal, but this is disadvantageous because in this case the pins 6 are not flexible and are not able to follow the movements of the sprayed die castings. Moreover, there is the danger of oxidation whereby the aspect of the finished shoe would be affected. Therefore, it is advantageous, if the pins 6 consist of plastic, preferably dyed through, so that they have likewise a certain flexibility. Furthermore, the pins 6 can be made in a color matching to the sole material whereby in case of pins dyed through this color is maintained even when the surface, for instance of the head of the pins, is damaged.

In case the sockets 3 are interconnected by tubular longitudinal straps 4, or if instead of the sockets 3 continuous tubes 8 are provided at all, as represented in the lower part of FIG. 1, then the uppers may be sewed as though onto the sole 1 because in such a case the sewing material can be passed through the tube from one lateral surface of the sole to the opposite one. The uppers have then a kind of seem within the fastening range to the sole whereby a decorative effect is achieved.

The sprayed die castings 2 shall have a certain elasticity in order that they are able to follow the movements of the shoe-sole 1 during walking and not to tear out in virtue of their rigidity in case of bendings or twistings of the shoe-sole and not to cause a damaging of this shoe-sole. These sprayed die castings 2 consist therefore suitably of a plastic material, the mechanical and physical properties of which being similar to those of the sole material, i.e. when a foamed sole material is used: to the properties of the same unfoamed sole material.

In order that the sprayed die castings 2 have the required properties, the sprayed die castings 2 embedded into a sole 1 of foamed soft-polyurethane consist of soft polymers, such as injectable caoutchouc with a hardness of 36 shore A to 98 shore D, and the sprayed die castings 2 embedded into a sole 1 of foamed semihard polyurethane consist of injectable harder polymers, such as polyamide, with a hardness of 65 shore A to 88 shore D. Thus, when a soft polyurethane foam is used as a sole material also soft sprayed die castings are employed whereas when semihard polyurethane is utilized for the sole material also the sprayed die castings are harder.

Particularly when semihard foamed polyurethane is used as a sole material, it is suitable, if the sprayed die castings 2 are not rigidly connected with the polyurethane but are able to move to some extent within the polyurethane in order not to be embarrassing to the rolling motion of the foot during walking. In order to prevent that the sole material would be damaged by such small relative movements between the sole and the sprayed die castings that could lead subsequently to a fissure in the sole material, the sprayed die castings 2 have a rounded cross-section, for instance a circular or an oval-shaped cross-section. Since in this way edges are avoided, local stresses of the sole material otherwise occurring within the range of these edges are prevented, such local stresses provoking a destruction of the sole, especially when they occur again and again.

When making a sole according to the invention, first the grating shown in FIGS. 2 and 3 is inserted in the above-mentioned manner into the mold. Afterwards, polyurethane-forming material is poured or injected into the mold either before or after the mold is closed, and is let solidify in the mold for forming the sole 1. At last the mold is opened and the sole 1 provided with the sprayed die castings 2 is released.

The sprayed die castings 2 of plastic have mechanical and physical properties matching to the corresponding properties of the sole 1 of foamed polyurethane so that they follow the movements of this sole 1 during walking on the one hand without a destruction of the sole at the location of the insertion of the sprayed die castings whereas on the other hand a secure anchoring of the uppers to the sole is ensured.

When semihard foamed polyurethane is used as a sole material, a rigid connection between the sole material and the sprayed die castings is not desirable in order that the latters can better follow the movements of the sole during walking. In such a case it is suitable to use a polyamide as a material for the sprayed die castings because polyamide does not form a firm bonding with the polyurethane.

The mold for carrying out the procedure is substantially characterized in that it is divided within the range of the lateral surface of the sole and that in at least one mold part recesses are provided along the separating line for receiving the free ends of the sprayed die castings. In this way the sprayed die castings 2 are easily fixed in the mold and are held in position without for instance pins being necessary for this purpose and being anchored within the mold which have to be inserted into openings of the sprayed die castings for fixing the same and which have to be withdrawn separately for releasing the sole from the mold. The free ends of the sprayed die castings 2 supported within the recesses of the mold project then from the lateral surface of the sole in the above-mentioned favourable manner after releasing from the mold.

What I claim is:

1. A shoe sole construction comprising a sole made of a plastic material, and fastening means embedded in said sole for securing a shoe sole upper thereto, said fastening means comprising a die casting made by sprayed die casting from an unfoamed plastic material, and die casting extending substantially transversely across said sole from one side edge thereof to the opposite side edge thereof and having outwardly facing openings therein which communicate with the exterior of said sole through the opposite side edges thereof for securing said upper thereof so that it abuts said side edges, said die casting further having anchoring means for anchoring said die casting in said sole.

2. A shoe-sole as claimed in claim 1, wherein said sprayed die castings are of a plastic material having mechanical and physical properties similar to those of the plastic material of the sole when said sole plastic material is in an unfoamed state.

3. A shoe-sole as claimed in claim 1, wherein the sprayed die castings are embedded into a foamed soft-polyurethane and consist of soft polymers having a hardness of 36 shore A to 98 shore D.

4. A shoe-sole as claimed in claim 1, wherein the sprayed die castings are embedded into a foamed soft-polyurethane and consist of soft elastomers having a hardness of 36 shore A to 98 shore D.

5. A shoe-sole as claimed in claim 4, wherein the sprayed die castings embedded into soft-polyurethane consist of injectable caoutchouc having a hardness of 36 shore A to 98 shore D.

6. A shoe-sole as claimed in claim 1, wherein the sprayed die castings are embedded into foamed semihard polyurethane and consist of injectable harder polymers having a hardness of 65 shore A to 88 shore D.

7. A shoe-sole as claimed in claim 1, wherein the sprayed die castings are embedded into foamed semihard polyurethane and consist of injectable harder elastomers having a hardness of 65 shore A to 88 shore D.

8. A shoe-sole as claimed in claim 6, wherein the sprayed die castings embedded into foamed semihard polyurethane consist of a polyamide.

9. A shoe-sole as claimed in claim 1, wherein the sprayed die castings have a rounded cross-section.

10. A shoe-sole as claimed in claim 9, wherein the sprayed die castings have a circular cross-section.

11. A shoe-sole as claimed in claim 9, wherein the sprayed die castings have an oval-shaped cross-section.

12. A shoe-sole as claimed in claim 1, wherein the sprayed die casting comprises
socket means arranged within the range of the side edges of the sole, said socket means defining said openings, and
longitudinal strap means extending across said sole interconnecting at least the socket means which are opposite to each other in axial direction.

13. A shoe-sole as claimed in claim 1, wherein the sprayed die castings comprise
tube means extending over the whole width of the sole.

14. A shoe-sole as claimed in claim 11, further comprising
transverse strap means interconnecting the socket means and the longitudinal strap means attached thereto to form a grating structure.

15. A shoe-sole as claimed in claim 13, further comprising transverse strap means joining the tube means to form a grating structure.

16. A shoe-sole as claimed in claim 12, wherein said longitudinal strap means have a smaller cross-section than said socket means.

17. A shoe-sole as claimed in claim 14, wherein said transverse strap means have a smaller cross-section than said socket means.

18. A shoe-sole as claimed in claim 14, wherein said transverse strap means have a smaller cross-section than said tube means.

19. A shoe-sole as claimed in claim 1, wherein said sprayed die castings project by a small amount from the lateral surfaces of the sole.

20. A shoe-sole as claimed in claim 14 or 15, wherein said grating structure comprises
stud means projecting from the bottom side of the grating structure.

21. A shoe-sole as claimed in claim 12, further comprising
pin means inserted into said socket means and having a diameter corresponding to the inner diameter of said socket means or exceeding the same only by a small amount.

22. A shoe-sole as claimed in claim 13, further comprising
pin means inserted into said tube means and having a diameter corresponding to the inner diameter of said tube means or exceeding the same only by a small amount.

23. A shoe-sole as claimed in claim 21, wherein said pin means comprise screw thread means and said socket means comprise internal thread means for receiving said screw thread means.

24. A shoe-sole as claimed in claim 22, wherein said pin means comprise screw thread means and said tube means comprise internal thread means for receiving said screw thread means.

25. A shoe-sole as claimed in claim 21, wherein said pin comprise barb means and said socket means comprise internal projections for cooperation with said barb means.

26. A shoe-sole as claimed in claim 22, wherein said pin means comprise barb means and said tube means comprise internal projections for cooperation with said barb means.

27. A shoe-sole as claimed in claim 21 or 22, wherein said pin means are made from plastic material.

28. A shoe-sole as claimed in claim 27, wherein said pin means are made from a plastic material being dyed through.

29. In the shoe sole construction of claim 1, said anchor means projecting outwardly in said sole in angular relation to the axes of said openings.

30. A method for making a shoe-sole, comprising the following steps:
(a) molding of a sprayed die casting so that it is dimensioned to extend across said sole from one side edge thereof to the opposite side edge thereof;
(b) arranging said sprayed die casting in a mold corresponding to the sole to be made in a spacing from the bottom of the mold;
(c) inserting a plastic material to be foamed into the mold so that said die casting is embedded in said plastic material and extends between the opposite side edges thereof for securing a sole upper to said sole; and
(d) after solidifying of the plastic material, releasing of the sole from the mold.

31. A method as claimed in claim 30, comprising the further step of
treating said sprayed die castings with a parting compound before their insertion into the mold.

32. In the method of claim 30, said step of molding sprayed die casting further characterized as molding sprayed die castings from an unfoamed plastic material, said sprayed die castings having outwardly facing openings and projections which extend outwardly relative to the axes of said openings for anchoring said die castings in a sole.

* * * * *